Oct. 1, 1968 A. V. CALABRO 3,403,434
BEARING RACE EXTRACTOR
Filed June 21, 1966
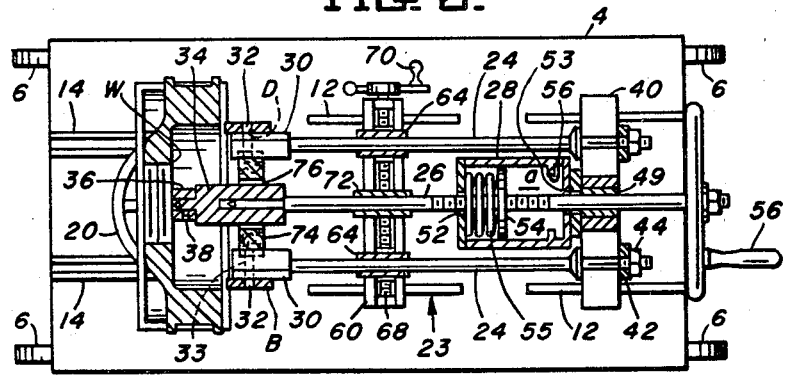
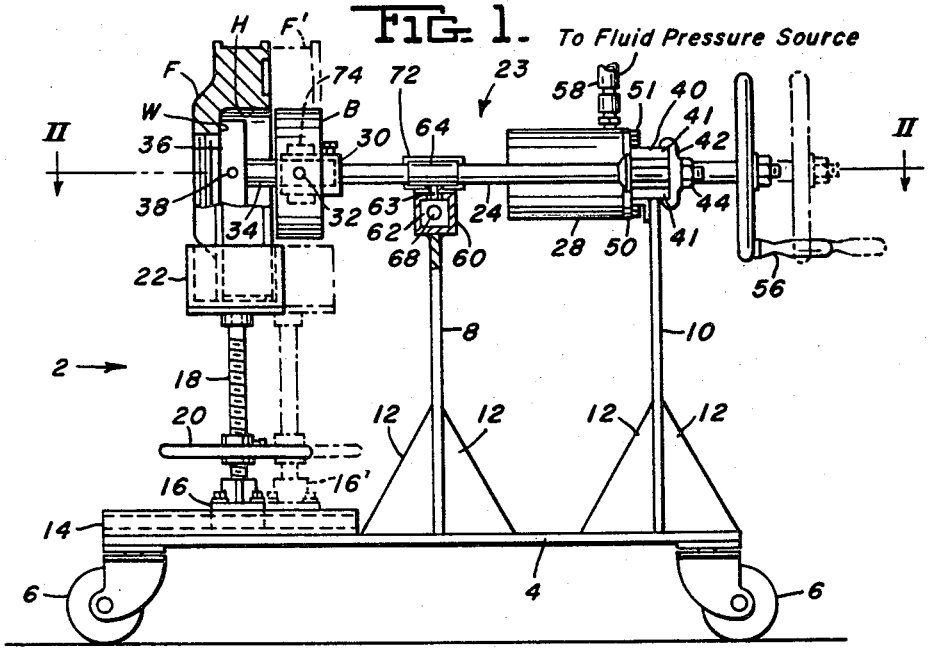
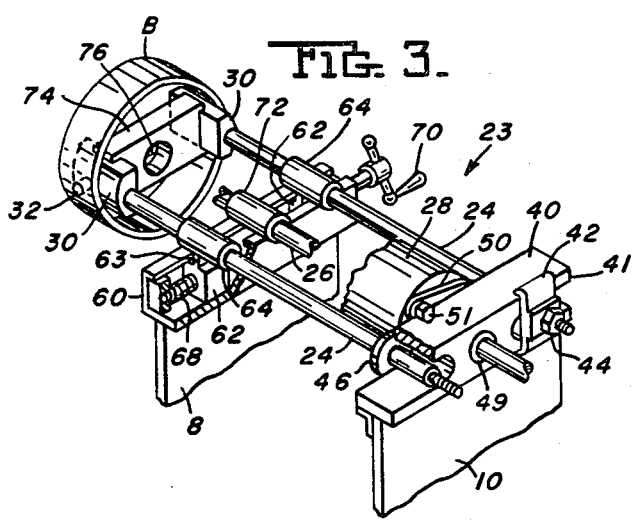
INVENTOR.
ANTHONY V. CALABRO
By Donald G. Dalton
Attorney United States Patent Office 3,403,434
Patented Oct. 1, 1968

3,403,434
BEARING RACE EXTRACTOR
Anthony V. Calabro, Monongahela, Pa., assignor to United States Steel Corporation, a corporation of Delaware
Filed June 21, 1966, Ser. No. 559,289
6 Claims. (Cl. 29—200)

This invention relates to apparatus for extracting an outer bearing race from a motor framehead or other housing.

In the repair of heavy-duty motors and other equipment having shafts that are subjected to heavy loads, it is often necessary to remove and replace the worn outer bearing races that support the shafts of such equipment. In the past, the removal of an outer bearing race has been a difficult task, since the race is shrunk-fitted into a hole in the housing. The common tools for removing an outer bearing race have been a drift pin and a hammer. The drift pin is inserted through one end of the hole in the housing holding the bearing race, and one end of the drift pin is lodged in one of the diametrically opposed oil supply holes in the wall of the bearing race. The workman then pounds on the other end of the drift pin until the bearing race is pushed out of the housing. This is a difficult and time consuming job and often takes several hours for a workman to remove one outer bearing race from its housing. Slight variations in these tools and the method employed with them have been devised, such as a rod that has its ends inserted in both diametrically opposed oil holes and is pounded in its middle section to extract the race. However, none of these tools or methods have substantially reduced the labor required to extract a bearing race.

In addition to requiring long hours of hard work, the use of hammers and drift pins has also had the disadvantage of being hazardous. The inside surface of the bearing race is only skin hardened and is extremely vulnerable to chipping. Thus, if a hard, steel drift pin is used against this surface, small particles of the bearing race skin are likely to fly from the area of pounding while the workman is attempting to remove the race. These particles are extremely dangerous since they travel at high speeds, and they have caused serious injuries to workmen in the past. The use of a softer drift pin, such as one made of brass, will help to reduce the amount of chipping of the bearing race, but this does not solve the problem completely.

It is therefore an object of my invention to provide apparatus for extracting an outer bearing race from its housing that will substantially reduce the time and work required to do the job, and will remove the safety hazard that has been present with the use of prior tools for extracting such bearing races.

This and other objects will be more apparent from the following description of my invention and the attached drawings, in which:

FIGURE 1 is a side elevation of apparatus for extracting an outer bearing race from a motor framehead, with parts thereof broken away;

FIGURE 2 is a top sectional view taken through lines II—II of FIGURE 1;

FIGURE 3 is a perspective view of the apparatus of of FIGURE 1, having a portion thereof broken away.

Referring to FIGURE 1, apparatus 2 includes a platform 4 that rolls on casters 6. A front vertical frame plate 8 and a rear vertical frame plate 10 are mounted on the platfom 4 and are reinforced by brace plates 12.

As seen from the side of FIGURE 1 and from the top in FIGURE 2, two parallel ways 14 are mounted on the front or left hand portion of platform 4. Slidably mounted along these ways 14 is a base member 16 (FIGURE 1) for supporting a framehead F. A threaded shaft 18 is turned through a tapped hole in the base member 16, and on top of the shaft 18 is rotatably mounted a tray 22, which supports the framehead F in an upright position. A handle 20 is provided on the shaft 18 for turning the shaft to adjust the height of the tray 22 and the framehead F.

The framehead F has an outer bearing race B that is shrunk-fitted into a hole H in the framehead. Assembly 23, mounted on vertical support plates 8 and 10, is designed to remove the bearing race B from the framehead. The main parts of this assembly include two laterally adjustable arms 24 (FIGURE 2) and a shaft 26 that is axially movable and is placed between the arms 24. Shaft 26 is driven back and forth by a hydraulic cylinder 28, and on its front end is mounted a cylindrical plunger 34 with a rectanguler plunger head 36 (FIGURE 1) secured to the plunger by a set screw 38. The plunger head 36 is designed to bear against the back wall W of hole H in framehead F and to push the framehead and its slidable support base member 16 backward from their dotted line positions F' and 16' (FIGURE 1) to their solid line positions.

Meanwhile, the bearing race B is held stationary by blocks 30, mounted on the front ends of arms 24. The blocks 30 are equipped with pins 32 which are designed to fit in diametrically opposed oil holes D of the bearing race B. Each pin 32 is set in a hole 33 in block 30 and is made of a hardened steel, harder than the other parts of arms 24, so that it will not easily break under shear stress.

The assembly 23 is connected to the rear vertical plate 10 by a cross bar 40, welded to the top edge of plate 10. The bar 40 has pairs of end flanges 41, as seen in the perspective view of FIGURE 3. Between each pair of flanges 41 is mounted one of the arms 24, which is slidable laterally between the flanges 41 and is restrained from axial movement by a rear plate 42 (FIGURE 1). A nut 44, threaded onto arm 24, holds the rear plate 42 against the back edges of flanges 41. Between the front edges of flanges 41 and a shoulder on the arm 24 is placed a washer 46.

The shaft 26 is slidably housed in a bushing 49 in the center of bar 40, as seen best in the perspective view of FIGURE 3. A plate 50 is welded to the front edge of bar 40, and bolts 51 secure the hydraulic cylinder 28 to the plate 50. As seen in FIGURE 2, the shaft 26 fits slidably through holes 52 and 53 in the front and rear ends of cylinder 28, but threadedly engages a hole in the center of piston 54 inside the cylinder 28. The shaft 26 can be turned by handle 56 to advance the shaft forward or backward relative to the piston 54. A compression spring 55 bears against the piston 54, and is shown in FIGURE 2 fully compressed by the pressure of hydraulic fluid in chamber $a$. However, when the pressure in chamber $a$ is reduced sufficiently, the spring 55 forces the piston 54 against circular flange 56. The hydraulic fluid is introduced into the chamber $a$ through fluid pressure line 58 (FIGURE 1).

The assembly 23 is supported on front vertical plate 8 by a channel support 60. As seen in the perspective view of FIGURE 3, two nuts 62 slide within the channel support 60, and each nut 62 is fixed by means of a pin 63 to a sleeve 64 that slides on one of the arms 24. A long screw 68 extends lengthwise through the channel support 60 and threadably engages the nuts 62. The screw 68 is restrained from axial movement within the channel support 60, and the ends of screw 68 are threaded in opposite directions so that when the screw is turned by handle 70, nuts 62 and connected arms 24 will move either toward each other or away from each other.

On the center of channel support 60 is welded a stationary sleeve 72, through which slides the shaft 26. The sleeve 72 keeps the shaft 26, the plunger 34, and the plunger head 36 centrally located between the arms 24 and blocks 30, and thus the shaft 26 is always pushed against the framehead F along a line parallel with the axis of bearing race B.

While the bearing race B is being extracted from framehead F, a spacer block 74 is positioned between the blocks 30 to insure that the arms 24 do not bend and that the pins 32 remain inside the holes H of the race B. The spacer block 74 has a hole 76, through which passes the plunger 34. Preferably, there is no contact between the plunger 34 and the wall of hole 76 in spacer block 74, since it is not the function of the spacer block 74 to support or position the plunger 34. Different sizes of spacer blocks 74 are needed for removing different sizes of bearing races B, and it is convenient to keep a set of such spacer blocks on the platform 4 or somewhere near the apparatus 2. These blocks may be made of wood, or other fibrous material such as Micarta, a trademark of Westinghouse Electric Corporation.

In operation, framehead F having an outer bearing race B is placed in the tray 22, and handle 20 is turned to raise the central axis of the bearing race B to the same level as shaft 26. The tray 22 is turned about its pivotal connection to shaft 18, so that the end of hole H which houses bearing race B faces toward the assembly 23. The base member 16 is pushed toward the assembly 23 until the framehead F is in the dotted line position F' (FIGURE 1) with the pins 32 on arms 24 aligned with oil holes D of bearing race B.

Handle 70 on the end of long screw 68 is turned to move the arms 24 and blocks 30 outwardly until pins 32 are inserted in oil holes D and the blocks 30 bear against the inner wall of outer bearing race B. Then, the spacer block 74, previously placed with the shaft 26 extending through its hole 76, is brought forward and placed between the blocks 30 to maintain the pins 32 in holes H. Handle 56 is turned to advance shaft 26 forward so that the head 36 of plunger 34 is pressed against the back wall W of framehead F. When this is accomplished, the hydraulic pressure in chamber $a$ of cylinder 28 is increased to force the shaft 26 to push the framehead F backward to its solid line position in FIGURE 2, with the bearing race B remaining stationary.

Since the pin 32 is made of hardened steel, harder than the other parts of arms 24, any failure of the arms 24 in trying to remove a particularly difficult bearing race is most likely to occur at the junction of metal block 30 and the narrower portion of arm 24, rather than at the pin 32. This means that there is less chance of the pin 32 being sheared off and projected outwardly from the apparatus 2 and possibly toward a workman standing near the apparatus. If a block 30 breaks off from the rest of its arm 24, it will merely fall inwardly from the wall of the bearing race B.

It can therefore be seen that the apparatus 2 is a much safer tool for removing bearing races from their housings than the tools that have been used in the past. Also, the total time required to set the apparatus up and remove a bearing race from its housing is usually no more than ten minutes, while prior methods and tools have often required many hours of hard work to do the same job.

While one embodiment of my invention has been shown and described herein, other adaptations and modifications will be apparent within the scope of the following claims.

I claim:

1. Apparatus for extracting an outer bearing race from its housing, said bearing race having diametrically opposed recesses in its inner surface, said apparatus comprising:
   a main frame;
   means mounted on said main frame for holding a housing with a bearing race to be removed therefrom, said means being slidable on said main frame in a direction parallel to the central axis of said bearing race;
   a pair of arms mounted on said frame and extending lengthwise in a direction substantially parallel to said central axis of said bearing race;
   means for holding said arms in stationary positions on said frame with an end portion of each arm inside the inner surface of said bearing race, said means for holding said arms being adjustable to move said arms laterally so that said end portions of the arms move toward and away from said axis of said bearing race;
   a pin mounted on each of said end portions of said arms extending laterally away from the other arm, said pin being adapted for insertion in said diametrically opposed recesses in said bearing race when said end portions of said arms are moved away from said axis of said bearing race and toward said inner surface of the bearing race; and
   means for pushing said housing relative to said frame in a direction parallel to said central axis of said bearing race while said bearing race is held in a fixed position relative to said frame by said pins inserted in said recesses in the bearing race.

2. Apparatus of claim 1 in which said means for pushing said housing relative to said frame includes:
   a cylinder mounted on said frame;
   a rod connected to said cylinder and aligned substantially parallel with said arms;
   a plunger mounted on said rod for engaging said housing; and
   means for introducing fluid into said cylinder to push said plunger against said housing to separate the housing from said outer bearing race.

3. Apparatus of claim 2 in which said end portions of said arms include metal blocks having cross-sections larger than said arms,
   said pins that are adapted for insertion in said recesses of the bearing race protruding from said metal blocks and having a hardness greater than said arms.

4. Apparatus of claim 3 also comprising a spacer block with its end surfaces engaging said metal blocks and holding said pins inserted in said recesses of the bearing race.

5. Apparatus of claim 1 in which:
   said arms have tapped holes extending perpendicular to their axis; and
   said means for holding said arms includes a screw placed substantially perpendicular to said arms and threadably engaging said tapped holes in said arms.

6. Apparatus of claim 1 in which said means for holding a housing includes:
   a base member slidably mounted on said main frame and having a tapped hole therein;
   a threaded shaft extending upwardly from said base member and threadably engaging said tapped hole in said base member; and
   means mounted on said threaded shaft and adapted for holding said housing in an upright position with said axis of said bearing race placed horizontally, said means for holding said housing being rotatable on said threaded shaft so that said housing can be turned to orient said axis of said bearing race in the direction in which said base member is slidable on said main frame.

References Cited
UNITED STATES PATENTS

| | | | |
|---|---|---|---|
| 2,085,529 | 6/1937 | Heimbach et al. | 29—263 |
| 2,158,433 | 5/1939 | Schultz | 29—252 |
| 2,596,549 | 5/1952 | Hamilton | 29—263 |
| 3,183,585 | 5/1965 | West | 29—149.5 X |
| 3,193,915 | 7/1965 | Gillie et al. | 29—200 |

THOMAS H. EAGER, *Primary Examiner.*